(12) United States Patent
Wentz

(10) Patent No.: US 11,861,400 B2
(45) Date of Patent: *Jan. 2, 2024

(54) SYSTEMS, DEVICES, AND METHODS FOR SELECTING A DISTRIBUTED FRAMEWORK

(71) Applicant: Ares Technologies, Inc., Boston, MA (US)

(72) Inventor: Christian T. Wentz, San Francisco, CA (US)

(73) Assignee: Ares Technologies, Inc, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/839,739

(22) Filed: Jun. 14, 2022

(65) Prior Publication Data

US 2022/0417023 A1 Dec. 29, 2022
US 2023/0132363 A9 Apr. 27, 2023

Related U.S. Application Data

(63) Continuation of application No. 16/812,094, filed on Mar. 6, 2020, now Pat. No. 11,379,263, and a (Continued)

(51) Int. Cl.

| G06F 9/48 | (2006.01) |
|---|---|
| G06F 9/38 | (2018.01) |
| G06F 9/50 | (2006.01) |
| H04L 9/32 | (2006.01) |
| G06F 16/29 | (2019.01) |

(52) U.S. Cl.
CPC .......... *G06F 9/4881* (2013.01); *G06F 9/3891* (2013.01); *G06F 9/5044* (2013.01); *G06F 16/29* (2019.01); *H04L 9/3213* (2013.01); *H04L 9/3221* (2013.01); *H04L 9/3278* (2013.01)

(58) Field of Classification Search
CPC ... H04L 9/3221; H04L 9/3278; H04L 9/3213; G06F 9/4881; G06F 16/29; G06F 9/3891; G06F 9/5044

See application file for complete search history.

(56) References Cited

U.S. PATENT DOCUMENTS

| 9,258,331 | B2 * | 2/2016 | Dyer .................... H04L 63/1416 |
| 10,320,569 | B1 * | 6/2019 | Wentz ..................... H04L 9/3239 |

(Continued)

*Primary Examiner* — Gary S Gracia
(74) *Attorney, Agent, or Firm* — Caldwell Intellectual Property Law

(57) ABSTRACT

A method of selecting a distributed framework includes identifying, by a selection device coupled to a memory, at least a first cryptographic evaluator of a plurality of cryptographic evaluators, wherein identifying the at least a first cryptographic evaluator further comprises and evaluating a secure proof generated by the at least a first cryptographic evaluator, and identifying the at least a first cryptographic evaluator as a function of the secure proof, assigning, by the selection device, a confidence level of the at least a first cryptographic evaluator, and selecting, by a selection device, a distributed framework from the plurality of cryptographic evaluators as a function of the confidence level, and assigning a task to the distributed framework.

22 Claims, 4 Drawing Sheets

Related U.S. Application Data continuation of application No. 16/539,206, filed on Aug. 13, 2019, now Pat. No. 11,316,692.

(60) Provisional application No. 62/718,376, filed on Aug. 13, 2018.

(56) References Cited

U.S. PATENT DOCUMENTS

| | | | |
|---|---|---|---|
| 11,379,263 B2* | 7/2022 | Wentz | G06F 9/5027 |
| 2008/0222425 A1* | 9/2008 | Buss | H04L 63/0823 |
| | | | 713/185 |
| 2010/0153928 A1* | 6/2010 | Livshits | H04L 43/50 |
| | | | 717/135 |
| 2013/0125226 A1* | 5/2013 | Shah | H04W 12/0431 |
| | | | 726/7 |
| 2013/0174241 A1* | 7/2013 | Cha | H04L 63/0815 |
| | | | 726/7 |
| 2014/0222730 A1* | 8/2014 | Vasseur | G06F 11/3433 |
| | | | 706/12 |
| 2015/0244685 A1* | 8/2015 | Shah | H04L 63/0428 |
| | | | 713/155 |
| 2015/0288521 A1* | 10/2015 | Nahari | H04L 63/0853 |
| | | | 713/170 |
| 2016/0127351 A1* | 5/2016 | Smith | G06F 21/316 |
| | | | 726/10 |
| 2016/0182497 A1* | 6/2016 | Smith | H04L 63/0407 |
| | | | 713/156 |
| 2017/0093803 A1* | 3/2017 | Nayshtut | H04L 63/1441 |
| 2017/0093806 A1* | 3/2017 | Phegade | H04L 63/0869 |
| 2017/0155662 A1* | 6/2017 | Courbon | H04L 63/107 |
| 2017/0344731 A1* | 11/2017 | Gefflaut | G06F 21/6218 |
| 2018/0006829 A1* | 1/2018 | Kravitz | H04W 12/06 |
| 2018/0131685 A1* | 5/2018 | Sridhar | H04L 9/3226 |
| 2018/0183586 A1* | 6/2018 | Bhargav-Spantzel | |
| | | | G06F 21/32 |
| 2018/0336552 A1* | 11/2018 | Bohli | G06Q 20/382 |
| 2018/0337920 A1* | 11/2018 | Stites | G06F 21/73 |
| 2018/0349610 A1* | 12/2018 | Gupta | G06F 9/5077 |
| 2018/0351753 A1* | 12/2018 | Gardner | H04L 9/3218 |
| 2019/0028281 A1* | 1/2019 | Turissini | G06F 21/57 |
| 2019/0199530 A1* | 6/2019 | Reitsma | H04L 9/3247 |
| 2019/0303541 A1* | 10/2019 | Reddy | G06F 21/64 |
| 2019/0303579 A1* | 10/2019 | Reddy | H04L 9/50 |
| 2019/0303623 A1* | 10/2019 | Reddy | G06F 8/71 |
| 2019/0305957 A1* | 10/2019 | Reddy | H04L 63/123 |
| 2019/0305959 A1* | 10/2019 | Reddy | H04L 9/006 |
| 2019/0306173 A1* | 10/2019 | Reddy | G06F 11/3604 |
| 2019/0312734 A1* | 10/2019 | Wentz | H04L 9/0877 |

* cited by examiner

SYSTEMS, DEVICES, AND METHODS FOR SELECTING A DISTRIBUTED FRAMEWORK

CROSS-REFERENCE TO RELATED APPLICATIONS

This application is a continuation of U.S. Nonprovisional application Ser. No. 16/539,206 filed on Aug. 13, 2019, and entitled "SYSTEMS, DEVICES, AND METHODS FOR SELECTING A DISTRIBUTED FRAMEWORK," which claims priority to Provisional Application No. 62/718,376 filed on Aug. 13, 2018, and entitled "SYSTEMS, DEVICES, AND METHODS FOR SELECTING A DISTRIBUTED FRAMEWORK", the entirety of each of which are incorporated herein by reference.

FIELD OF THE INVENTION

The present invention generally relates to the field of data storage and authentication in distributed computing systems. In particular, the present invention is directed to systems, devices, and methods for selecting a distributed framework.

BACKGROUND

Distributed frameworks can provide a useful way to perform complex computation, or computation involving large datasets, rapidly and efficiently, as well as a way to distribute computational tasks across multiple devices. However, processes for selection and use of distributed frameworks are often inefficient or insecure, may over-rely on centrally managed security, or may suffer a lack of efficient scalability.

SUMMARY OF THE DISCLOSURE

In an aspect, a method of selecting a distributed framework is provided. A method of selecting a distributed framework includes identifying, by a selection device coupled to a memory, at least a first cryptographic evaluator of a plurality of cryptographic evaluators. Identifying the at least a first cryptographic evaluator includes evaluating a secure proof generated by the at least a first cryptographic evaluator. The evaluating the secure proof includes receiving verification datum corresponding to the secure proof and evaluating the secure proof as a function of the verification datum and a temporally sequential listing. Identifying the at least a first cryptographic evaluator also includes identifying the at least a first cryptographic evaluator as a function of the secure proof. The method of selecting a distributed framework also includes assigning, by the selection device, a confidence level of the at least a first cryptographic evaluator. The method of selecting a distributed framework also includes selecting, by a selection device, a distributed framework from the plurality of cryptographic evaluators as a function of the confidence level. The method of selecting a distributed framework also includes assigning a task to the distributed framework.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
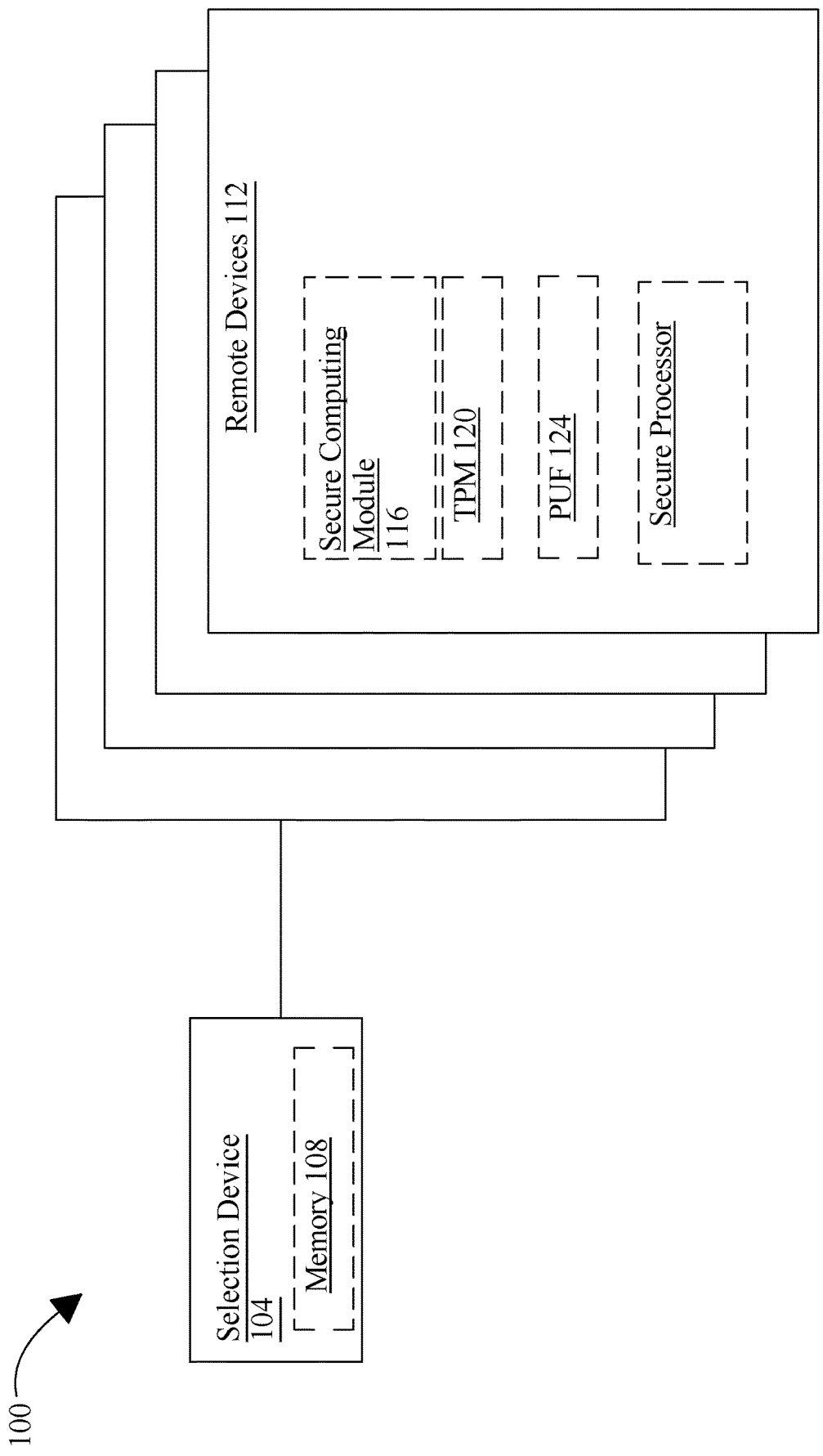
FIG. 1 is a block diagram illustrating an exemplary embodiment of a system for selecting a distributed framework.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In an embodiment, disclosed systems and methods present a flexible, scalable, and reliable method for selecting and deploying an optimally secure and efficient distributed network. Use of trusted hardware and related technology may enable rapid and decentralized authentication of devices; in embodiments, block-chains or similar distributed data management facilities may be used in authentication and device selection, permitting efficiency of rapid lookup to be coupled to reliability of consensus and other methods for authentication.

Systems and methods as described herein may involve computation, calculation, assessment, assignment, or use of a confidence level associated with one or more processes, devices, or data, including without limitation one or more processes, appraisals, and/or cryptographic evaluators as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system.

Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithm problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

Figure 2:
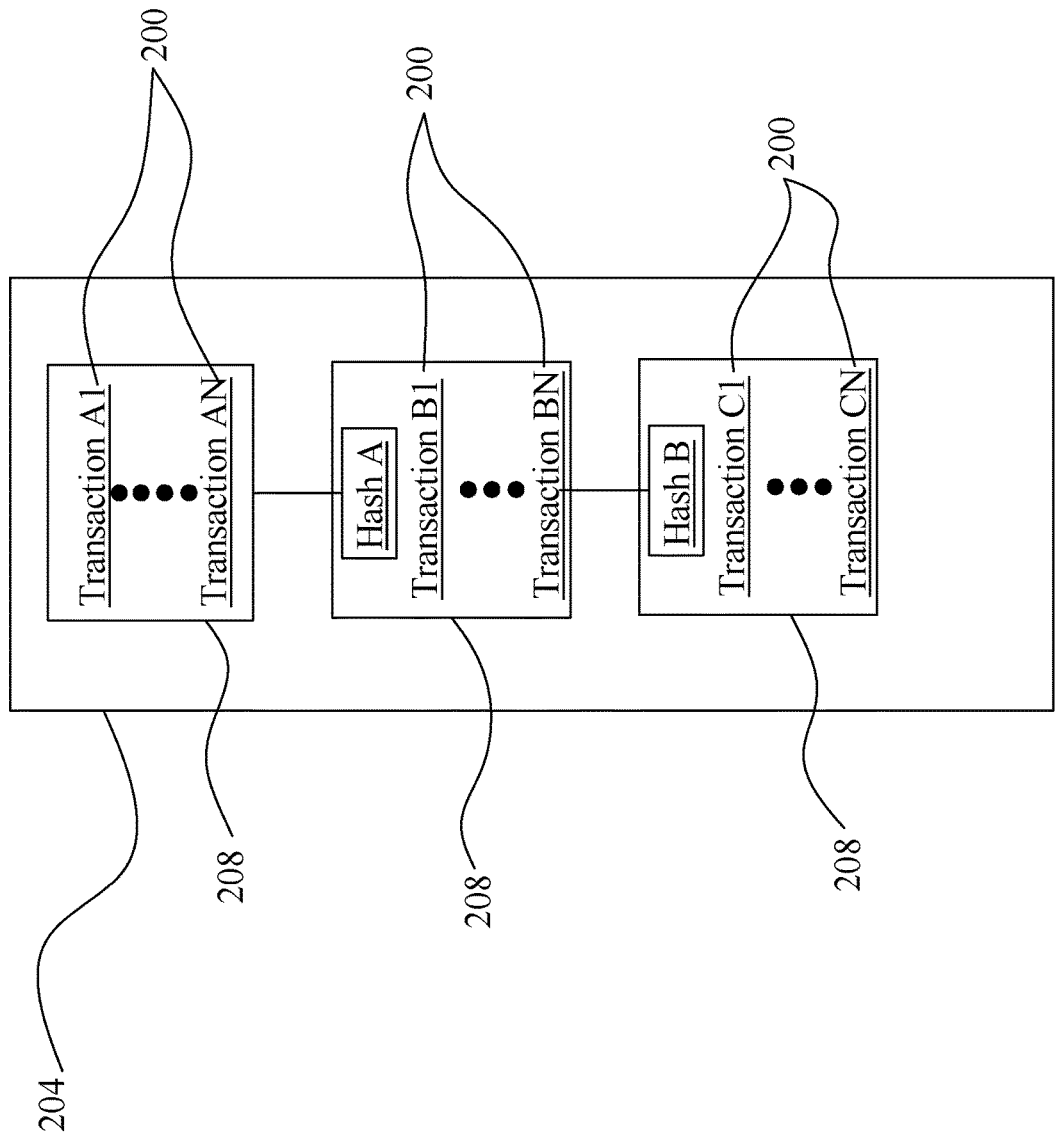
FIG. 2 is a block diagram of an exemplary embodiment of a temporally sequential listing.

In an embodiment, and continuing to refer to FIG. 2, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Provisional Application No. 62/815,493, filed on Mar. 8, 2019, and entitled "METHODS AND SYSTEMS FOR IMPLEMENTING AN ANONYMIZED ATTESTATION CHAIN," the entirety of which is incorporated herein by reference.

Still viewing FIG. 2, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 2, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 116 as described in further detail below; in such scenarios, authentication may include proof by the secure computing module 116 that the secure computing module 116 possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Certificate authority may be implemented in a number of ways, including without limitation as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Provisional Application No. 62/758,367.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, a system 100 for selecting a distributed framework. System 100 includes a selection device 104. Selection device 104 may include any computing device as described in this disclosure, including without limitation a microcontroller, microprocessor, digital signal processor (DSP) and/or system on a chip (SoC), or a Graphic Processing Unit (GPU) as described in this disclosure. Selection device 104 may include, be included in, and/or communicate with a mobile device such as a mobile telephone or smartphone. Selection device 104 may include a single computing device operating independently, or may include two or more computing device operating in concert, in parallel, sequentially or the like; two or more computing devices may be included together in a single computing device or in two or more computing devices. Selection device 104 may interface with one or more additional devices as described below in further detail via a network interface device. Network interface device may be utilized for connecting a selection device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Selection device 104 may include but is not limited to, for example, a selection device 104 or cluster of computing devices in a first location and a second computing device or cluster of computing devices in a second location. Selection device 104 may include one or more computing devices dedicated to data storage, security, distribution of traffic for load balancing, and the like. Selection device 104 may distribute one or more computing tasks as described below across a plurality of computing devices of computing device, which may operate in parallel, in series, redundantly, or in any other manner used for distribution of tasks or memory between computing devices. Selection device 104 may be implemented using a "shared nothing" architecture in which data is cached at the worker, in an embodiment, this may enable scalability of system 100 and/or computing device.

Still referring to FIG. 1, selection device 104 is coupled to a memory 108. Memory 108 may include any form of memory described below in reference to FIG. 4. Memory 108 may be incorporated in a device containing selection device 104, distributed through several devices, which may contain selection device 104, or a component thereof, or in another device accessible to selection device 104 via electronic communication. Selection device 104 may be communicatively connected a plurality of cryptographic evaluators 112. Selection device 104 may be designed and configured to perform any method step or steps as disclosed herein; as a non-limiting example, selection device 104 may be designed and configured to identify at least a first cryptographic evaluator of the plurality of cryptographic evaluators assign a confidence level of the at least a first cryptographic evaluator, and select a distributed framework from the plurality of cryptographic evaluators as a function of the at least a first cryptographic evaluator as a function of the confidence level.

With continued reference to FIG. 1, any cryptographic evaluator of plurality of cryptographic evaluators may include a secure computing module 116. As used herein, a secure computing module 116 is a hardware element configured to perform one or more secured operations beyond the control of other circuit elements or software, whether incorporated with the secure computing module 116 in a circuit or computing device, or a part of an extrinsic computing device. As a result, at least one secured operation performed by secure computing module 116 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 116 and/or a system or computing device incorporating secure computing module 116 based on the above-described set of assumptions. As a non-limiting, example, a secure computing module 116 designed to produce an expected result despite all software-only attacks may give rise to a first confidence level, whereas another secure computing module 116 designed to produce its expected result in the face of all software or hardware attacks may give rise to a second confidence level; the second confidence level may be higher, owing to the reduced probability that the second secure computing module 116 would be compromised.

Still viewing FIG. 1, secure computing module 116 may include a trusted platform module (TPM 120). In an embodiment, a TPM 120 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 120 may have any suitable elements of digital or analog circuitry usable to perform one or more processes as described herein, including without limitation processes used to determine confidence levels and/or authenticate digitally signed assertions as described below. TPM 120 may have memory and/or other logic and/or a processor in its own right which may be in a non-limiting example a crypto-processor. TPM 120 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 116 may include at least PUF 124. PUF 124 may be implemented by various means. In an embodiment, PUF 124 includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 124 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 124 may include a circuit producing a PUF via cross-coupled logical or analog circuit elements. As a non-limiting example, static random access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 124 in an embodiment include without limitation buskeeper PUFs, which may be similar to other PUFs based on bistable memory elements, but leveraging buskeeper cells. PUF 124 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate, but is bistable (like the SRAM PUF). Using reset logic, the bistable ring may destabilize and subsequently stabilize into a state that is set by the random silicon manufacturing variations.

Continuing to view FIG. 1, PUF 124 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 124 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-acorn dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range, and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characterictic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker, and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204*a-b*. A number of dots in a device such as an RID does may not be reproducible, or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUB, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 124 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 124 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer, Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate, Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe microcavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 124 that may be used may include, without limitation, nano-electromechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 124 and/or TPM 120; such outputs may be used to generate symmetric or asymmetric keys, private keys, zero-knowledge proofs, or other proofs of authenticity, as described in further detail below.

Continuing to refer to FIG. 1, secure computing module 116 may implement one or more secure memory storage protocols. One or more secure memory storage protocols may be protocols designed to prevent unauthorized access to memory and/or to protect secure computing module 116 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 116. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software based encryption techniques discussed in this disclosure. In an embodiment, secure computing module 116 may incorporate a memory controller located within the trusted computing boundary to encrypt and authenticate by a secret key memory elements such as without limitation memory page tables and/or memory pages accessible by other software elements, such as an operating system. Various techniques, processes, means or elements may be used to implement the above-described secure memory protocols.

For instance, secure computing module 116 may use hardware-enabled access control to protect memory access; hardware access control may, as a non-limiting example, be performed by tagging each memory entry with a "container identifier" corresponding to a page, file, or other grouping of memory, enabling secure computing module 116 to determine whether tampering has occurred.

Secure computing module 116 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 116 may operate using one or more dedicated memory objects, registers, or storage elements; as a non-limiting example, secure computing module 116 may operate with dedicated cache lines not available to other processes or circuits, preventing, e.g., stack or buffer overrun attacks to corrupt or steal data. Dedicated memory elements may be wired only to secure computing module 116; access to dedicated memory elements may be rendered impossible except by way of secure computing module 116. Secure computing module 116 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 116 may utilize oblivious random access memory (RAM) wherein memory access patterns are obfuscate to prevent detection of memory access patterns by outside observers attempting to deduce execution details regarding processes performed using secure computing module 116 Secure computing module 116 and/or device incorporating secure computing module 116 may incorporate a trusted non-volatile storage device that provides some means of verification of secure storage capability and other properties. Memory protocols as described above may be used to implement methods of attested storage and the chain of trust beginning at PUF 124 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 116.

Still referring to FIG. 1, secure computing module 116 may include a secure processor. Secure processor may be a processor as described below in reference to FIG. 5. Secure processor may operate autonomously from other processors and/or an operating system operating on at least a cryptographic evaluator; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM 120, to frustrate alteration and/or probing to discover and/or alter private keys. Private keys may be demonstrable as uniquely associated with secure processor by use of PUF 124 as described above; secure processor may include, for instance, a TPM 120 as described above. Alternatively or additionally, a certificate authority as described above, which may be a manufacturer of secure processor, may verify that one or more public keys are associated uniquely with secure processor according to any protocol suitable for digital certificates.

With continued reference to FIG. 1, secure computing module 116 may implement one or more methods of attested computation. Attested computation may include or involve one or more methods to ensure that computation of a program, known as an attested program, is trusted and signed by secure computing module 116 and/or computing device incorporating secure computing module 116; this may be supported by means to assert the state of the system memory, code, and input data. In an embodiment, secure computing module 116 and/or a computing device incorporating secure computing module 116 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 116 and/or computing device incorporating secure computing module 116 may append a cryptographic signature based upon any private key that may be associated with secure computing module 116 as described herein. Secure computing module 116 and/or computing device incorporating secure computing module 116 may operate a security reset of working memory prior to load of data for trusted computation; for instance, the secure computing module 116 and/or computing device incorporating secure computing module 116 may append a hash of the memory to cryptographic hash of system state following reset and prior to loading data. Secure computing module 116 and/or computing device incorporating secure computing module 116 may append its authentication signature of memory page tables and/or memory tables. Upon completion of the trusted computation, which may include execution of program code of system state, secure computing module 116 and/or computing device incorporating secure computing module 116 may append an output value of the trusted computation to cryptographic hash of system state. In an embodiment, an output value of the trusted computation may itself be cryptographically hashed and/or encrypted; encryption may be performed using any form of hardware or software based encryption that may be associated with secure computing module 116. Secure computing module 116 and/or computing device incorporating secure computing module 116 may include a system to compute one or more hash trees of cryptographic hash of the computation, system state, and/or outputs; secure computing module 116 and/or computing device incorporating secure computing module 116 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still viewing FIG. 1, in an embodiment, a non-secure processor and/or secure computing module 116 initiate a trusted protocol stack upon startup. For instance, and without limitation, selection device 104 and/or secure computing module 116 may implement a secure boot and/or attested boot protocol. In an embodiment, a basic input/output system (BIOS) that initiates upon startup of selection device 104 may compute a cryptographic hash of a boot loader of an operating system running on selection device 104; cryptographic hash may include boot drivers of one or more processes that initiate when selection device 104 starts up. Secure computing module 116 may then digitally sign cryptographic hash; cryptographic hash with or without digital signature, may be stored in memory. Selection device 104 may subsequently refuse to load any process that is not also signed with digital signature; this may in turn be used to perform attested computing procedures as described above.

Continuing to refer to FIG. 1, selection device 104 may implement at least a software monitor to enforce security invariants, and protected memory primitives, which may be referred to herein as enclaves. As used herein, a software monitor is a software component that operates in highest privilege mode of the processor, such as without limitation machine mode in the non-limiting example of the RISC-V processor ISA and may have exclusive access to a portion of memory, e.g. DRAM. The software monitor may check allocation decisions of software operating on selection device 104 and or a plurality of processors and/or computing devices making up a secure enclave for correctness and commit them into hardware configuration registers. Such software may include without limitation operating system, kernel, hypervisor, and/or guest OS. In this nomenclature, an operating system handles scheduling and demand paging, and a hypervisor may multiplex CPU cores of selection device 104 or devices. In a representative embodiment, software monitor may intermediate untrusted system software handling of isolated machine resources. Software monitor may verify decisions made by software operating on selection device 104 and/or devices for any events that may cause change in the protection domain/privilege mode of the selection device 104 and/or devices, including without limitation interrupts and fault handling, and may configure low level hardware resources when in at least a particular privilege mode. Hardware resources may include, without limitation, memory, such as physical memory pages, cache lines, processor cores that include all microarchitectural state, L1 cache and register files, and other resources. Software monitor may consider isolated protection domains including the monitor itself, enclaves, and untrusted software. Software monitor may ensure that resource allocation for one protection domain may not be modified by any other domain.

Still referring to FIG. 1, software monitor may be implemented in microcode, operate in the highest privilege level (e.g. machine mode in RISC-V processor), be implemented in hard coded logic, reconfigurable logic with protections on reconfiguration, or any combination of the foregoing. As a non-limiting example, software monitor may be invoked when software is executed in a secure enclave, and handle context switches between secure enclave mode, to and from less privileged mode(s). Software monitor may receive interrupt requests when operating a secure enclave operation, exit enclave operation including flushing of state and in example parking of enclave execution, and delegate the interrupt back to the operating system. Software monitor may intermediate handling of machine resources analogous to system calls in a typical OS. Software monitor may be conceived of as a state machine having states that may, as a non-limiting example, implement steps as follows: Software monitor may receive an event and authenticate a caller of the event; this may lead to three possibilities: (1) If caller is an OS interrupt and a secure enclave isn't operating, then the OS may receive the event; (2) If caller is an enclave interrupt, and the enclave has the handler, then the enclave may receive the event; otherwise, the enclave may asynchronously exit, meaning enclave cleans sensitive processor state, may park the enclave state in protected memory, and may delegate event to the OS—otherwise, the enclave may receive the event; (3) If event is a monitor call, and caller is authorized, then the request may be validated. If the request is concurrent, it may be handled, if it is invalid, it is thrown out and the caller may be flagged as potentially malicious; if it is valid, and no concurrent operations are happening, the monitor may proceed to change state cleanly (e.g., clean sensitive processor state and then switch privilege modes.

Continuing to refer to FIG. 1, to ensure protection domains are enforced, software monitor may enforce resource state transitions, which may occur in a non-limiting example as follows: if a resource requested is owned by owner (current user) or software monitor itself, the resource may be blocked. A requesting OS may demand the resource, in which case the sensitive processor state may be cleaned, and resource made available; finally the OS may grant the resource to a new owner. Software monitor may include a map of resource to owner, and lock on resource. These resource metadata may be pre-allocated to the monitor's binary image in case of statically partitioned resources such as cores and cache partitions. Software monitor may contain a cryptographic measurement (e.g. a hash) of certificates, keys, and of at least a first enclave. In an embodiment, software monitor may include an associated base address/address mask pair register in hardware that protects the location of the software monitor in memory space from corruption, bitmapped protected memory provisions, and the creation of page tables for each enclave within protected memory.

A secure boot and/or attested boot process may be used to achieve trustworthiness of software monitor and/or selection device 104 may execute a chain of attested boot upon reset to prove that the software monitor has not been tampered with and the at least a first enclave, referred to below as the signing enclave, is correctly constructed, such that core executed within the enclave may be considered trusted. Reset may occur on startup, restart, and/or upon a hard or soft reset of selection device 104.

Continuing to view FIG. 1, a non-limiting example illustrating, an attested boot sequence in a processor with at least one core is presented; this example is provided for expository purposes, and implementation of attested boot, related secure programming using selection device 104 and/or secure computing module 116 may be performed according to any processes and/or procedures that may occur to persons skilled in the art upon reviewing the entirety of this disclosure may operate according to an assumption that selection device 104 possesses a device specific secret, such as without limitation a cryptographic key pair, has been signed by a manufacturer of secure computing module 116, selection device 104 and/or other component or module described herein, such that one may evaluate the authenticity of the device by proof of possession of a valid signature; a device specific secret has been signed by a manufacturer, as used herein, where the manufacturer, or a device operated by the manufacturer, signs a verification datum, such as a public key, generated using the device-specific secret. Digital signature of manufacturer may be any digital signature as described above. As a result, a verification datum signed by manufacturer may be linked to secure proofs generated by device identifier using device-specific secret, such that manufacturer signature identifies secure computing module 116. In an embodiment, link of the manufacturer signature to device-specific secret may be used to verify authenticity of the software monitor by authentic signature of the device and cryptographic proof of construction of the software monitor Still viewing FIG. 1, in an embodiment a first core of a processor may be initialized; other cores may wait on interrupt from the first core. In an exemplary sequence, upon initialization of a first core, a cryptographic measurement root code may be booted from resistant hardware, such as, without limitation, on-chip read-only memory (ROM), and/or other hardcoded memory or circuitry. Software monitor may subsequently be loaded into memory from at least a non-volatile programmable memory. In an embodiment, all other memory address space may be cleared, zeroed, and/or set to a uniform value to achieve a known initial state. Continuing the illustrative example, at secure computing module 116 and/or a component thereof may generate device-specific secret; alternatively, a pre-shared secret may be loaded from protected memory, such as without limitation on-chip ROM, XOM, hardcoded circuitry, or the like. Further continuing the illustrative example, software monitor may be processed via a one-way cryptographic hash function as described above; an output of cryptographic hash function may be input to a key derivation function (KDF) along with device-specific secret, secure proof derived from device-specific secret, and/or verification datum derived from device-specific secret to generate software monitor public/private key pair. Cryptographic measurement root code may configure selection device 104 to sign software monitor public key and/or hash of the software monitor using device private key, and/or to cause device identifier to create a secure proof signing software monitor public key and/or hash of software monitor, establishing an attestation certificate of the software monitor. As noted above, measurement root may include dedicated circuitry that configures a computing device and/or secure computing module 116 to check the authenticity of the software monitor; for instance, the measurement root may generate an at least a first attestation key pair and sign the software monitor's public key with the processor's key system as described above.

Still referring to FIG. 1, examples of secure computing module 116s may include, without limitation, a TPM 120 as described above. Secure computing module 116 may include a TPM 120 combined with a boot-measuring protocol using hash trees, Merkle trees, or the like to measure boot entries to create an "attested boot." Secure computing module 116 may include a trusted execution technology (TXT) module combining TPM 120 with establishment of a secure container at run-time; secure container may be isolated from a software stack and OS of at least a temporal attester 104 and/or use TPM 120 to measure and attest to secure container prior to launch. Secure computing module 116 may include execute-only memory (XOM). Secure computing module 116 may include an Aegis processor. Secure computing module 116 may include a Bastion processor.

Secure computing module 116 may implement a trusted enclave, also known as a trusted execution environment (TEE). In an embodiment, a trusted enclave may be a portion of a computing device that is isolated from the main processor of the computing device. Isolation may be achieved using elements of secure computing module 108 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 116 from CPU and/or input/output devices or connections. Inputs and outputs to and from trusted enclave may be restricted and controlled tightly by a secure processor and/or TPM as described above. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, CA RISC V architecture, including without limitation sanctum processors, Ascend secure infrastructure, Ghostrider secure infrastructure, ARM TrustZone, Trusted Little Kernel (TLK) as promulgated by Nvidia Corporation of Santa Clara, CA, and Secure Encrypted Virtualization (SEV) as promulgated by Advanced Micro Devices, Inc. of Santa Clara, CA, and/or any other suitable architecture. Persons skilled in the art, upon reviewing the entirety of this disclosure, will be aware of various additional or alternative trusted computing processes that may be used to implement secure computing module 116, TEE, or trusted enclaves as disclosed herein. System 100 may incorporate or communicate with a certificate authority, which may include any certificate authority and/or version thereof as described in this disclosure.

Referring now to FIG. 2, system 100 may be used to perform one or more processing steps necessary to create, maintain, and/or authenticate a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a cryptographic evaluator as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. In an embodiment, the temporally sequential listing may be a directed acyclic graph (DAG), in which multiple branches may be generated on or by different devices implementing temporally sequential listing 204, and branches may be merged into one another, while a hash chain or similar structure ensures that branches cannot go "back in time" whether merged or not; secure timestamps and/or attested time may be further included to impose a temporal order on a DAG or other temporally sequential listing 204. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, CA, or the Stellar Development Foundation, of San Francisco, CA, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order, and links each sub-listing 208 to a previous sub-listing 208 in the chronological order, so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208 In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208 The incentive may be financial; for instance, successfully mining a new sub-listing 208 may result in the person or entity that mines the sub-listing 208 receiving a predetermined amount of currency. The currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP_RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a cryptographic evaluator, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the cryptographic evaluator) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, CA In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 5. For example, and without limitation, at least a digitally signed assertion 200 may include one or more encrypted or otherwise secured or partitioned memory entries as entered for instance using a secure computing module 116 or according to a secure computing protocol as described in further detail below.

Referring again to FIG. 1, in some embodiments, secure computing module 116 and/or cryptographic evaluator may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing module 116s, man in the middle or other attacks.

Figure 3:
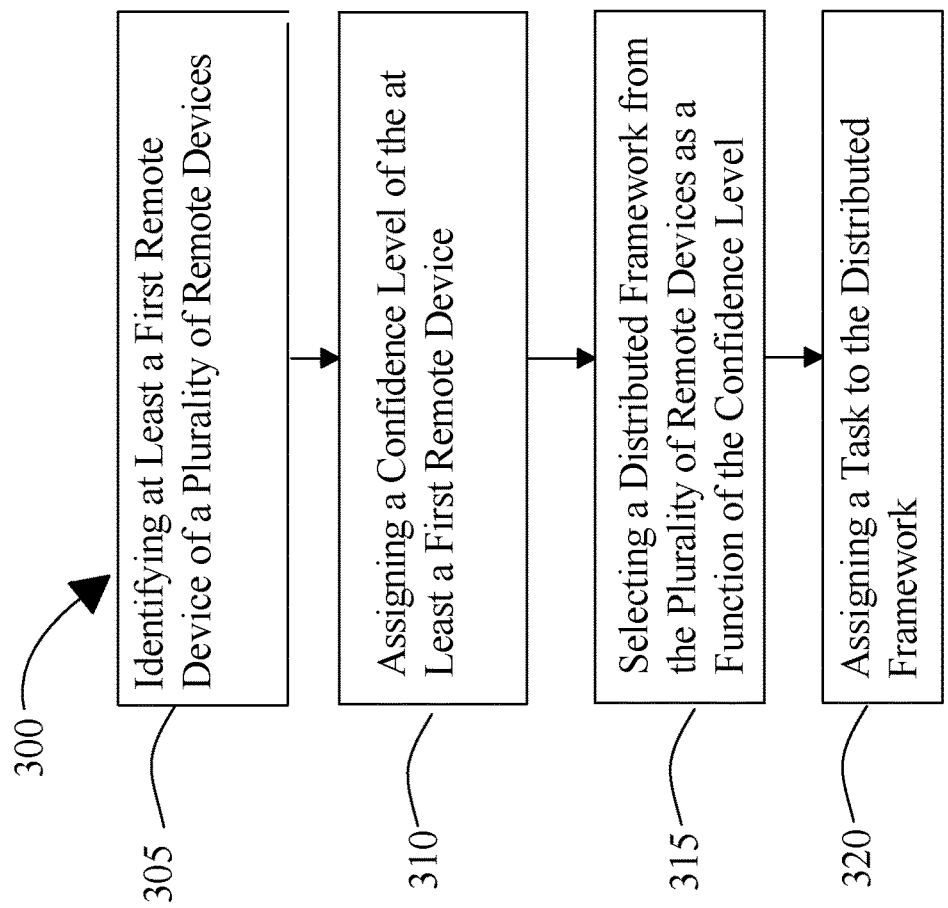
FIG. 3 illustrates particular implementations of various steps of a method of selecting a distributed framework.

Referring now to FIG. 3, an exemplary embodiment of a method 300 of selecting a distributed framework is illustrated. At step 305, selection device 104 identifies at least a first cryptographic evaluator of a plurality of cryptographic evaluators 112. Identifying may include, as a non-limiting example, comparing at least a datum received as an identifier from at least a first cryptographic evaluator to one or more stored values; one or more stored values may be stored in a temporally sequential listing as described above. One or more stored values may be stored in a database or other data structure. Identifying may include comparison of a digitally signed assertion and/or secure proof, as described in further detail below, in a temporally sequential listing or other data structure to a digitally signed assertion and/or secure proof received from at least a first cryptographic evaluator.

Still referring to FIG. 3, identifying the at least a first cryptographic evaluator may include evaluating a secure proof generated by the at least a first cryptographic evaluator and identifying the at least a first cryptographic evaluator as a function of the secure proof. Secure proof may include any secure proof as described above including without limitation a secure proof demonstrating possession of a secret stored in or produced by secure computing module 116 and/or PUF 124. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

With continued reference to FIG. 3, secure proof may include a digital signature. In an embodiment, digital signature may be any digital signature as described above; digital signature may be created by signing a mathematical representation of first dataset. In an embodiment, at least a first cryptographic evaluator may generate a key to be used in producing digital signature using secure computing module 116. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a first cryptographic evaluator and/or secure computing module 116 may convert immediate output from PUT 124 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a first cryptographic evaluator and/or secure computing module 116 may extract one or more random numbers based on a PUF 124 output to create a symmetric key as described above. Alternatively or additionally, extraction may include extraction of a private key of a public key cryptographic system.

Still referring to FIG. 3, key extraction may include use of a number output by a PUF 124 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 124; steps along a chosen elliptic curve may then be performed using random number to generate a public key. Initial point on elliptic curve and elliptic curve may be selected using a additional random numbers, which may be generated using any suitable method; random numbers associated with curves having known vulnerabilities may be discarded, according to mathematical descriptors or other characteristics of such vulnerabilities as stored in memory of or accessible to at least a first cryptographic evaluator and/or secure computing module 116. Persons skilled in the art, upon reading the entirety of this disclosure, will be aware of various ways in which a random number may be used to generate a private and public key pair consistently with this disclosure.

Still viewing FIG. 3, key extraction may utilize a numerical output from a PUF 124 or other element of secure computing module 116 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 124 and/or elements of secure computing module 116 may generate one or more random numbers, for instance by using one or more PUFs as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 3, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 116 may act as a "first signer" of a digital signature, signing with a private key produced from a secret generator module as described above, which may be a group key. In an embodiment Secure computing module 116 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by Secure computing module 116 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like.

Still referring to FIG. 3, secure proof may include be generated using a physically unclonable function. For instance, and without limitation, an output of a PUF 124 may be used to generate a private key for a digital signature as described above. Alternatively or additionally, a PUF 124 output may constitute a secret to be used as a basis for a zero-knowledge proof, which may be any zero-knowledge proof as described herein.

Still referring to FIG. 3, secure computing module 116 and/or at least a first cryptographic evaluator may generate one or more elements of additional information that user or device may use to evaluate secure proof. For instance, secure computing module 116 and/or at least a first cryptographic evaluator may generate a public key; public key may be provided automatically to any querying device. Alternatively or additionally, public key may be provided to a manufacturer of secure computing module 116, permitting manufacturer to act as a certificate authority for secure computing module 116. Similarly, secure computing module 116 and/or at least a first cryptographic evaluator may generate data necessary to perform verification of a zero-knowledge proof by any verifier as described above.

With continued reference to FIG. 3, evaluating the secure proof may include receiving a verification datum corresponding to secure proof and evaluating the secure proof as a function of the verification datum. Verification datum, as used herein, is any datum that may be used to aid in evaluation of secure proof; for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof.

In an embodiment, and still viewing FIG. 3, identifying the at least a first cryptographic evaluator may include identifying a first cryptographic evaluator using a first identification protocol and identifying a second cryptographic evaluator using a second identification protocol, wherein the first identification protocol is distinct from the second identification protocol. As a non-limiting example, a first cryptographic evaluator of at least a first cryptographic evaluator may be identified using a TTP protocol, while a second may be identified using a DAA protocol. As a further example, a first cryptographic evaluator may be identified using a first version of a secure computing module 116 incorporated in the first cryptographic evaluator, while a second cryptographic evaluator may be identified using a second version of a secure computing module 116; the first version may, for instance, be a GhostRider implementation while the second is an SGX implementation, or the like. In an embodiment, identification of cryptographic evaluators using heterogenous methods decreases the likelihood of an exploit successfully compromising all evaluators, as such an exploit would be required to take advantage of a potentially wide range of different vulnerabilities. Furthermore, in an embodiment selection device 104 may perform a time-of-evaluation selection of identification protocols, for instance by selecting from a stored menu of protocols using a random number generator or pseudorandom number generator; this may further decrease the probability of a successful exploit.

At step 310, and with continued reference to FIG. 3, selection device determines a confidence level of the at least a first cryptographic evaluator. At least a confidence level may include a single confidence level assigned to a single cryptographic evaluator, a plurality of confidence levels assigned to a plurality of cryptographic evaluators, an aggregate confidence level of a plurality of cryptographic evaluators, or any other single or plural confidence level as described herein. Assigning a confidence level may include evaluating at least a digitally signed assertion signed by a cryptographic evaluator of the at least a first cryptographic evaluator, and assigning a confidence level to the cryptographic evaluator as a function of the evaluation of the at least a digitally signed assertion. At least a digitally signed assertion may be identified as signed by at least a first cryptographic evaluator using any identification process or protocol as described above. In an embodiment, at least a digitally signed assertion may be incorporated in a temporally sequential listing of digitally signed assertions. For instance, where temporally sequential listing is a blockchain or similar data structure, each assertion may be included in the blockchain. At least a second digitally signed assertion may include a plurality of digitally signed assertions. For instance, at least a first cryptographic evaluator may record a series of digitally signed assertions in temporally sequential listing; each transaction of the series of transactions may be authenticated by any process suitable for authenticating temporally sequential listing, including any process described herein for authentication of temporally sequential listing. As a further non-limiting example, at least a first cryptographic evaluator may enter an initial digitally signed assertion attesting to one or more elements of identification and/or authentication, including without limitation attestation of manufacturing date of at least a first cryptographic evaluator and/or secure computing module 116, identities, serial numbers, versions, or make of hardware components of at least a first cryptographic evaluator and/or secure computing module 116, or the like. Transactions performed by at least a cryptographic evaluator may be scored according to authenticity; for instance, trusted status may be conferred on at least a cryptographic evaluator only if a certain number of authenticated transactions have been performed by at least a cryptographic evaluator, a certain amount of value has been conveyed in authenticated transactions by at least a node, a certain proportion (which may be 100%) of transactions performed by at least a cryptographic evaluator have been successfully authenticated, or any other suitable benchmarking and/or scoring process or combination thereof. At least a digitally signed assertion may include assertions that were recorded in rejected instances of a temporally sequential listing 204, such as rejected forks; in an embodiment, confidence level may be reduced as a function of a number of rejected forks including assertions signed by at least a cryptographic evaluator, for instance.

Still referring to FIG. 3, assigning the at least a confidence level may include receiving a consensus evaluation of the at least a confidence level from a network of cryptographic evaluators. for instance, all cryptographic evaluators currently connected to network may determine a confidence level concerning a particular cryptographic evaluator. This determination may be performed, for instance, by authenticating one or more current or past instances of a temporally sequential listing 204 and/or one or more sub-listings 208 thereof. Determination may include identification of one or more rejected instances of temporally sequential listing 204. Each cryptographic evaluator of plurality of cryptographic evaluators may provide a confidence level for the cryptographic evaluator to be evaluated. Selection device 104 and/or another processor communicatively coupled to network may calculate an aggregate confidence level based on confidence levels submitted by plurality of cryptographic evaluators; aggregation may be performed according to any method for aggregation of confidence levels described above. In an embodiment, aggregation may be weighted according to a previously determined confidence level of each cryptographic evaluator of plurality of cryptographic evaluators performing consensus determination of confidence level of cryptographic evaluator to be evaluated. This may include, e.g., ignoring confidence level submissions from evaluators having confidence levels below a certain threshold; alternatively or additionally, selection device 104 may request confidence level determinations by a plurality of evaluators previously determined to have a confidence level above a certain threshold level. Each cryptographic evaluator and/or other processor participating in consensus determination of confidence level may perform any action described herein for determining a confidence level, or any combination of such actions.

With continued reference to FIG. 3, assigning the at least a confidence level may include evaluating a digitally signed assertion assigning a recorded confidence level to a cryptographic evaluator of the at least a first cryptographic evaluator, and assigning the confidence level as a function of the recorded confidence level. Digitally signed assertion may be any digitally signed assertion as described herein. Digitally signed assertion may be included in any temporally sequential listing as described herein; temporally sequential listing may include a temporally sequential listing relating identifiers of cryptographic evaluators to confidence levels, where identifiers may be any data usable as identifiers as described herein. Assignment of confidence level may be performed as a function of identifier; that is, identifier may be linked to an identity of a cryptographic evaluator, which may be used for assignment of confidence level as described in this disclosure. Selection device 104 may receive an instance of temporally sequential listing; receiving may include receiving an entire copy of the instance, receiving a sub-listing, receiving a link to temporally sequential listing, or a portion thereof, stored remotely, receiving digitally signed assertion along with an indication of temporally sequential listing containing digitally signed assertion, or the like. As a non-limiting example, one or more processors, a consensus process, selection device 104, and/or a network of cryptographic evaluators having a confidence level in excess of a threshold, may have previously evaluated a confidence level in a certain cryptographic evaluator; in an embodiment, such a confidence level may itself be recorded in an assertion listed in temporally sequential listing 204. A plurality of such assertions, corresponding to a plurality of cryptographic evaluators, may be listed; as such, selection device 104 may determine confidence level in one or more cryptographic evaluators solely by retrieving confidence levels so recorded. Alternatively or additionally, selection device 104 may combine such confidence levels with confidence level determinations made by other means. Combination may be performed, e.g., by retrieving such confidence levels from temporally sequential listing 204 for at least a first cryptographic evaluator, and calculating a confidence level for at least a second cryptographic evaluator by any other process described above. As a further example, selection device 104 may retrieve a confidence level recorded in temporally sequential listing 204 for a given cryptographic evaluator, determine a confidence level for the same cryptographic evaluator, and then aggregate the two confidence levels according to any process as described above for aggregation of confidence levels. Selection device 104 may determine confidence level using an algorithm assessing a number of connections from one device to another, such as without limitation a number of references to first cryptographic evaluator by other cryptographic evaluators in hypertext markup language (HTML) files or the like.

Still referring to FIG. 3, selection device 104 may further weight or modify confidence level according to one or more additional factors. For instance, confidence level may be weighted according to how recently cryptographic evaluator signed a digitally signed assertion in an authenticated instance of temporally sequential listing 204, where a more recently authenticated assertion may result in a higher confidence level or higher weight assigned to the confidence level, and a less recently authenticated assertion may result in a lower confidence level or a lower weight assigned to that confidence level. As another example a cryptographic evaluator that has recently "sold off" a large amount of value and/or has an assertion in a sub-listing 208 currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

With continued reference to FIG. 3, assigning the at least a confidence level may include performing a trusted time evaluation of at least an action performed by the at least a first cryptographic evaluator. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via decentralized anonymous attestation (DAA)) to verify that the secure computing module 116 is an authentic secure computing module 116 that has the property of attested time. Attested time may be implemented, without limitation, as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference.

With continued reference to FIG. 3, secure timestamp may be recorded the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 116. Additional data may include one or more additional data, including sensor data or a hash of data, that are received or generated by temporal attester 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other cryptographic evaluators may evaluate confidence levels in at least a first cryptographic evaluator or other party generating secure timestamp and/or perform threshold cryptography with a plurality of such parties, each of which may have performed an embodiment of method to produce a secure timestamp. In an embodiment, cryptographic evaluators or other parties authenticating first digitally signed assertion 200 may perform authentication at least in part by evaluating timeliness of entry and/or generation of first digitally signed assertion 200 as assessed against secure timestamp. In an embodiment, secure proof is generated using an attested computing protocol; this may be performed, as a non-limiting example, using any protocol for attested computing as described above.

Still referring to FIG. 3, selection device 104 may determine a confidence level in an identity of the at least a first cryptographic evaluator; assigning the at least a confidence level may include assigning the at least a confidence level as a function of the at least a confidence level in the identity. Confidence level in identity may be computed, for instance, using one or more statistical measures of reliability of the identification method used; for instance, a user may enter an instruction on selection device 104 providing statistics indicating success rates of various identification methods. Statistics may be collected based, as a non-limiting example, on discoveries of vulnerabilities in particular identification protocols and/or particular instances of secure computation module. User may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise assigning a confidence level as a function of the confidence level in the identity. Selection device 104 may also determine confidence level in identity as a function of, for instance, one or more algorithms collecting statistics concerning degree of accuracy in past iterations of method 400 of a particular process for identifying at least a cryptographic evaluator.

At step 315, and still referring to FIG. 3, selection device 104 selects a distributed framework from plurality of cryptographic evaluators as a function of the at least a confidence level. A distributed framework, as used herein, is a network containing one or more computing devices amongst which computational and/or data storage tasks are distributed, including without limitation computational tasks and/or data storage tasks as disclosed in further detail herein. Distributed framework may enable a device calling upon distributed framework, including without limitation selection device 104, to treat one or more network-connected devices assembled in the distributed framework as a single device or pool that performs computational and/or storage tasks. Distributed framework may be use any suitable protocol for such task distribution, including without limitation any protocol and/or protocols as described herein, the Message Passing Interface (MPI) protocol, the HADOOP protocol promulgated by the Apache Software Foundation of Wakefield, MA, and or the SPARK protocol promulgated by the Apache Software Foundation. Selecting distributed framework may include selecting a distributed framework including at least a first cryptographic evaluator. Distributed framework may include solely the at least a first cryptographic evaluator; for instance, selection device 104 may select one or more cryptographic evaluators having confidence levels recorded in temporally sequential listing, and select the one or more cryptographic evaluators as the distributed framework. Alternatively or additionally, one or more cryptographic evaluators and/or other devices may be selected for distributed framework by at least a first cryptographic evaluator and/or using first cryptographic evaluator as a reference point.

Still referring to FIG. 3, selections of devices for distributed framework may be determined according to proximity according one or more measures of distance or time between each cryptographic evaluator and selection device 104, between at least a first cryptographic evaluator and each selected cryptographic evaluator, and/or between at least a first cryptographic evaluator and selection device 104. For instance, and without limitation, where the plurality of cryptographic evaluators is connected to the selection device via a network, selecting the distributed framework further comprises selecting at least a proximate cryptographic evaluator of the plurality of cryptographic evaluators in a graph representing the network; a proximate at least a cryptographic evaluator on a graph, may include, for instance, a at least a cryptographic evaluator within a certain number of steps through the graph from the once device to another. Steps may also be weighted according to, e.g., estimates of physical distance or length of wire between cryptographic evaluators 112 connected by steps, as measured using network latency analysis and/or other processes for instance as described below. As another non-limiting example, selecting the distributed framework may include selecting at least a geographically proximate cryptographic evaluator of the plurality of cryptographic evaluators. Geographical location of selection device 104, at least a first cryptographic evaluator and/or at least a device selected as part of distributed framework may be performed by analysis of IP addresses, which may be compared to stored information mapping such addresses to particular geographical locations or the like; geographical location of any devices as described above may alternatively or additionally be determined using navigational facilities, such as the global positioning system (GPS) or other protocols used to determine the location of a device. Distance between devices may be computed using this information and compared to a threshold value; a device may be selected only if distance from selection device 104 and/or at least a first cryptographic evaluator is below the threshold value, which may include, for instance, a radius of a certain number of miles or kilometers around the determined location of the selection device 104, at least a first cryptographic evaluator, and/or another device.

With continued reference to FIG. 3, selecting the distributed framework may include selecting at least a temporally proximate cryptographic evaluator; this may be at least a cryptographic evaluator that under network latency analysis, time for response to a "ping" signal, or the like presents a likelihood of a more rapid response. Alternatively or additionally, past response times and/or past times in which generation of appraisals as described in further detail below was performed may be recorded in memory 108 and/or in temporally sequential listing 204; selection of at least a cryptographic evaluator may be performed based on past performance time. Selection of distribute framework may include selection of at least a device to minimize total communication latency, where total communication latency is total expected time for each cryptographic evaluator, or other device, to respond with an appraisal as described in further detail below; such selection may involve determining, for instance, a selection of plurality of cryptographic evaluators 112 presenting an optimal or near-optimal network traversal time, which may be computed using node-count distances, geographical distances, network communication latency times, and/or expected performance times by particular cryptographic evaluators 112. Such optimization may involve a near-optimal resolution of a "traveling salesman" problem, including without limitation a "greedy algorithm" in which each selection step involves choosing a locally optimal cryptographic evaluator 112; for instance, selection device 104 may choose a first "nearest" cryptographic evaluator 112 as measured by any of the above metrics, including any measure of actual or path distance and/or any measure of communication or computation latency. Continuing the example, selection device 104 may subsequently select a second cryptographic evaluator according to a locally optimal next selection under the above-described metric or metrics, selecting from locally optimal steps that either at least a first cryptographic evaluator, selection device 104, either, or both may perform. This may be repeated until a desired number of cryptographic evaluators 112 is selected; "desired" number may be a raw threshold number, an aggregate confidence level as described in further detail below, or the solution to another optimization problem such as optimization of confidence versus speed as described in further detail below. Alternatively or additionally, optimal selection may make use of data concerning previously performed transactions; use of such data may include selection of an acceptably rapid previous transaction, or use of a plurality of previous selections to produce an algorithmic or mathematical solution to optimal selection using, e.g. a polynomial regression process, a neural-net machine learning process, or the like. Persons skilled in the art will be aware of various machine learning, deep learning, or other adaptive techniques that may be used to approach such an optimization problem, upon reviewing the entirety of this disclosure.

Still referring to FIG. 3, selection may include selection of only highly trusted cryptographic evaluators, for instance as determined by determination of confidence levels as described below, such that the fewest cryptographic evaluators are required for a given security requirement. These methods may be used to optimize network performance of authentication processes. In another example, additional data as described above that are incorporated into blocks or otherwise made available to nodes of the network may be utilized to optimally select which cryptographic evaluators are selected.

In another embodiment, and continuing to refer to FIG. 3, selecting distributed framework may include establishing an aggregate confidence-level threshold determining confidence levels of one or more cryptographic evaluators of the plurality of cryptographic evaluators, and/or of one or more other devices that may be incorporated in distributed framework, aggregating the confidence levels of the one or more cryptographic evaluators to generate an aggregate confidence level, determining that the aggregate confidence level satisfies the aggregate confidence-level threshold, and selecting the one or more cryptographic evaluators. Evaluation of confidence level of each of the plurality of cryptographic evaluators may be performed as described in further detail herein. Establishment of an aggregate confidence level in a plurality of cryptographic evaluators 112 or other devices having a plurality of associated confidence levels may involve, e.g., adding together confidence levels; alternatively, aggregate confidence level may be computed by viewing each confidence level as a probability, calculating an aggregate probability by averaging or other statistical combination processes, and selecting cryptographic evaluators 112 or other devices so as to result in an aggregate probability representing a desired confidence level. Alternatively or additionally, a machine-learning algorithm as described above may analyze past transactions to determine an optimal mathematical operation for calculating an aggregate confidence level. As noted below, a desired confidence level to be used as a threshold may be computed in turn by reference to a user input indicating a desired confidence level, a minimal confidence level set by selection device 104 and/or network, for instance to ensure some degree of overall network integrity, a calculation based on a value of a transaction recorded in at least a digitally signed assertion 116, or the like.

Still referring to FIG. 3, selecting the distributed framework may include generating a cost function of confidence level and communication latency and minimizing the cost function. In an embodiment, cost function may be selected to optimize one or more user and/or network goals. Goals to be optimized may include, without limitation, a desired degree of latency (defined herein as a speed with which at least a computational or storage task to be performed by distributed framework occurs), security (which may be defined, e.g., as a degree of confidence in the accuracy of the task, a degree of confidence in the data integrity of the task, a degree of confidence in protection from data breeches and/or theft of information, and/or a degree of confidence in faithful performance of the computation by distributed framework), anonymity (defined as a degree of difficulty in obtaining information concerning a user of querying device and/or a person entering a transaction on temporally sequential listing 204), and throughput (defined as an aggregate or average latency across users, cryptographic evaluators, and or other devices). There may be tradeoffs between the above-mentioned four goals. For instance, if user wishes to perform a task rapidly, reducing the number of nodes in at least a highly trusted at least a cryptographic evaluator may improve the speed with which authentication can take place, as may selection of proximate nodes as described above. Anonymity, however, may favor selection of more widely scattered cryptographic evaluators or other devices to make it more difficult to deduce where selection device 104 is located geographically or within network; additional measures to ensure anonymity, such as use of an anonymizing protocol such as the Tor protocol promulgated by The Tor Project, Inc., which functions by directing all internet traffic through a network containing a plurality of relays to conceal a user's location and usage from network surveillance and/or traffic analysis attempts, using "onion routing" processes, or the like may further increase latency and slow down authentication. Similarly, where greater security is a goal selections a highly trusted devices may be maximized, and/or across a wider range of network locations and/or geographical locations to improve the likely independence of nodes, also slowing the process. Selection of greater numbers of nodes, with lesser network latency between them, may also enable greater performance or capacity in computational or storage tasks. Thus, a person or device who wants to perform a task very secretly may desire a very high degree of security and anonymity, and may accept a greater degree of latency in exchange. A user or device seeking to perform a task with a high degree of security, but without a need for rapid performance or storage capacity may use a small number of highly trusted nodes. As another non-limiting example, a task may require fast, high-security, processing, relying on high degree of trust and low anonymity. As a further example, processes involving medical data may require high anonymity and high security, which may be emphasized above speed. In an embodiment, the ability of method 300 or variations thereof to modify these parameters for optimal results in different scenarios may be highly advantageous over existing methods.

With continued reference to FIG. 3, cost function may be dynamically set by a selected degree of optimization for one or more attributes. Determining degree of optimization may be performed via a user interface, which may be a graphical user interface (GUI), for instance by providing a user with one or more sliders representing desired degrees of security, transaction speeds, and/or levels of anonymity; sliders may be linked to absolute ranges of the attributes or may alternatively be used proportionally to represent relative importance to user of each attribute. Positions of one or more sliders may be reset according to stored mathematical relationships between different items; mathematical relationships may be determined by combining or producing machine-learning processes. A related or separate set of mathematical relationships may be used to determine how selection of at least a highly trusted at least a cryptographic evaluator affects each attribute. Protocol implemented in embodiments herein may support varying security and anonymity demands by the parties to the transactions. For instance, two parties wishing to exchange $5M over the network will demand commensurate security and require some reduction in anonymity to comply with federal laws, in exchange for slightly longer validation times. Conversely, a customer purchasing a coffee at Starbucks will demand relatively little security and may be fully anonymous; a potential malicious actor utilizing a great number of small transactions to hide a large total transaction from regulators may be thwarted by identifying anonymous certificates that are re-used above some threshold and flagged by the network. This may allow network to self-adapt to meet varying demands.

With continued reference to FIG. 3, mathematical relationships between attributes and each other and/or between attributes and selection of distributed framework may be derived by collection of statistics concerning past transactions. In some embodiments, statistical relationships are determined through one or more machine learning processes; for instance, data describing the speed, authenticity, and anonymity of a plurality of past transactions may be subjected to regression analysis, such as linear or polynomial regression, to determine one or more equations relating one parameter of such transactions to one or more other such parameters. Similarly, a neural net may be provided with such a plurality of past transactions. Machine-learning processes may be supervised and/or unsupervised; for instance, attributes to compare may be preselected to ensure that machine-learning processes result in relationships between desired attributes and transaction parameters. Mathematical relationships may demonstrate, e.g., that a certain number of nodes in at least a highly trusted node results in a 95% degree of confidence, that a second, higher number of nodes results in a 98% degree of confidence, and the like. As a further example, mathematical relationships may associate a level of anonymity, as measured in average proportion information content concerning user and/or selection device 104 obtainable from a transaction, information entropy of transaction, or the like, to average network or geographical distance between nodes of at least a highly trusted node, to selection of protocols to anonymize, and the like. Relationships between, the above parameters and latency may also be represented. Direct relationships between attributes to be optimized may be determined by machine learning processes; alternatively or additionally, such relationships may be determined using relationships of each attribute to parameters of selected device.

In an embodiment, and still referring to FIG. 3, selection may include assigning an authorization token granting an access right to at least a first cryptographic evaluator. An "authorization token" as used in this disclosure is a token granting an access right, signed by a device generating authorization token, such as without limitation selection device 104. Authorization token may include a temporal attribute. To facilitate anonymity, in an exemplary embodiment of authorization token in which it is desired to maintain anonymity of the remote device while using at least a authorization token, the at least a authorization token may contain at least one of the following attributes: a secure timestamp indicating the time that the token was created, a monotonic counter value or other datum unique to the authorization token for this particular cryptographic evaluator, and/or a session key conferring access to the network at the time of token creation. Additionally or separately, at least an authorization token may include an expiration period, e.g. a fixed time limit relative to the verifier's local time the token was created or issued, and may include at least a trust level based upon the properties of the cryptographic evaluator or other device attested in the authorization process, as described herein. It may be desirous to separately or additionally provide at least a session key enabling cryptographic evaluator to encrypt and/or decrypt messages to at least an additional cryptographic evaluator, or at least a group of cryptographic evaluators, based on properties of commonality therebetween. In non-limiting example, session key may be a symmetric key conveyed via secure channel from the at least a verifier, and/or an asymmetric key, multisignature, threshold signature or key system resulting from multi-signature or threshold signature as described above, or other key system or datum associated with at least a verifier during at least a time epoch. In an embodiment, a temporal attribute associated with an authorization token may be determined and/or generated based on confidence level; for instance, a first cryptographic evaluator that has been assigned a first confidence level may be issued a first authorization token by selection device 104 having a first expiration period, and second cryptographic evaluator that has been assigned a second confidence level that is less than, or indicative of a lower degree of confidence than, first confidence level may be issued a second authorization token having a second expiration period of lesser duration than the first expiration period. In an embodiment, selection device 104 and/or any other device generating authorization tokens may re-evaluate a length of an expiration period, upon expiration of an authorization token associated with a cryptographic evaluator; for instance, and without limitation, selection device 104 and/or other device generating authorization tokens may perform any step described above for evaluation of confidence levels, including without limitation generating a new or updated confidence level for the cryptographic evaluator and/or making any determination regarding the cryptographic evaluator described above as usable for determination and/or assigning of a confidence level. Where a newly determined confidence level is higher or indicative of greater confidence, and/or determination results in a conclusion that would, if used in determinations of confidence level as described above, cause and/or tend toward generation of a higher confidence level, a subsequently and/or concurrently generated authorization token may have a new expiration period of longer duration, and/or may not expire at all; where a newly determined confidence level is lower or indicative of lesser confidence, and/or determination results in a conclusion that would, if used in determinations of confidence level as described above, cause and/or tend toward generation of a lower confidence level, a subsequently and/or concurrently generated authorization token may have a new expiration period of shorter duration, and/or may not be generated at all if confidence level and/or result of determination falls below a threshold as described above. Authorization tokens, temporal attributes, and/or attested time may be implemented according to any embodiments described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference.

With continued reference to FIG. 3, at least a first cryptographic evaluator may assist in selection of one or more additional devices, which may be cryptographic evaluators of plurality of cryptographic evaluators, or may be other devices connected to network. For instance, and without limitation, selecting the distributed framework may include receiving an identification of at least a second cryptographic evaluator of the plurality of cryptographic evaluators from the at least a first cryptographic evaluator, and selecting the at least a second cryptographic evaluator as a function of the identification of the at least a second cryptographic evaluator. The identification of the at least a second cryptographic evaluator may include a digitally signed assertion generated by the at least a first cryptographic evaluator; digitally signed assertion may be created using any protocol for creation of a digitally signed assertion, including a digital signature signed with a private key possessed and/or generated by at least a first cryptographic evaluator, a secure proof, as defined above, generated according to any protocol or combination of protocols as described above by first cryptographic evaluator, or the like. Identification of at least a second cryptographic evaluator and/or other device may include verification information that may be combined with a secure proof issued by second cryptographic evaluator to verify or authenticate second cryptographic evaluator, including without limitation an address as described above, a public key as described above, a verification associated with a zero-knowledge proof, or the like. Selection device 104 may select one or more of at least a second cryptographic evaluator (or other device), including less than all cryptographic evaluators of at least a second cryptographic evaluator (or other device) according to any criteria as described above for selection of at least a first cryptographic evaluator and/or any device included in distributed framework, including without limitation by determining confidence levels in individual devices and/or aggregate confidence levels, comparison of confidence levels to threshold values, minimization of cost functions and/or optimization of network distance or latency, or any other procedure described above.

At step 320, and still viewing FIG. 3, selection device 104 assigns a task to the distributed framework; task may include a computational task, a storage task, or any combination thereof. This may be performed in any suitable manner for division of tasks, including distributed storage using, for instance, distributed hash tables, temporally sequential listings, JAVA HDFS as promulgated by Oracle, a resilient distributed dataset, or the like. Assignment of task may be performed by partitioning or dividing data and/or computational tasks by a "master" device amongst one or more "slave" devices; "master" device may be selection device 104, a device having a high confidence level as described above, including without limitation first cryptographic evaluator. For instance, and without limitation, a task requiring processing of a large quantity of data, for instance sorting or searching within the data, may be divided among "slave" devices by partitioning the data into "chunks," each of which is sent to one or more distinct devices; devices may then perform local portions of the overall computing task with regard to their respective partitions, followed by a recombination of the computing outputs to produce a final result. Recombination of outputs may be performed by "master" device. Allocation of computational or data storage tasks may be performed to minimize network latency costs, which may be done using any calculations or processes to minimize latency, minimize network distance, and/or minimize geographical distance, as described above; in other words, "selection" may be performed a first time to select distributed framework, and (optionally) a second time for maximally efficient distribution of tasks.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
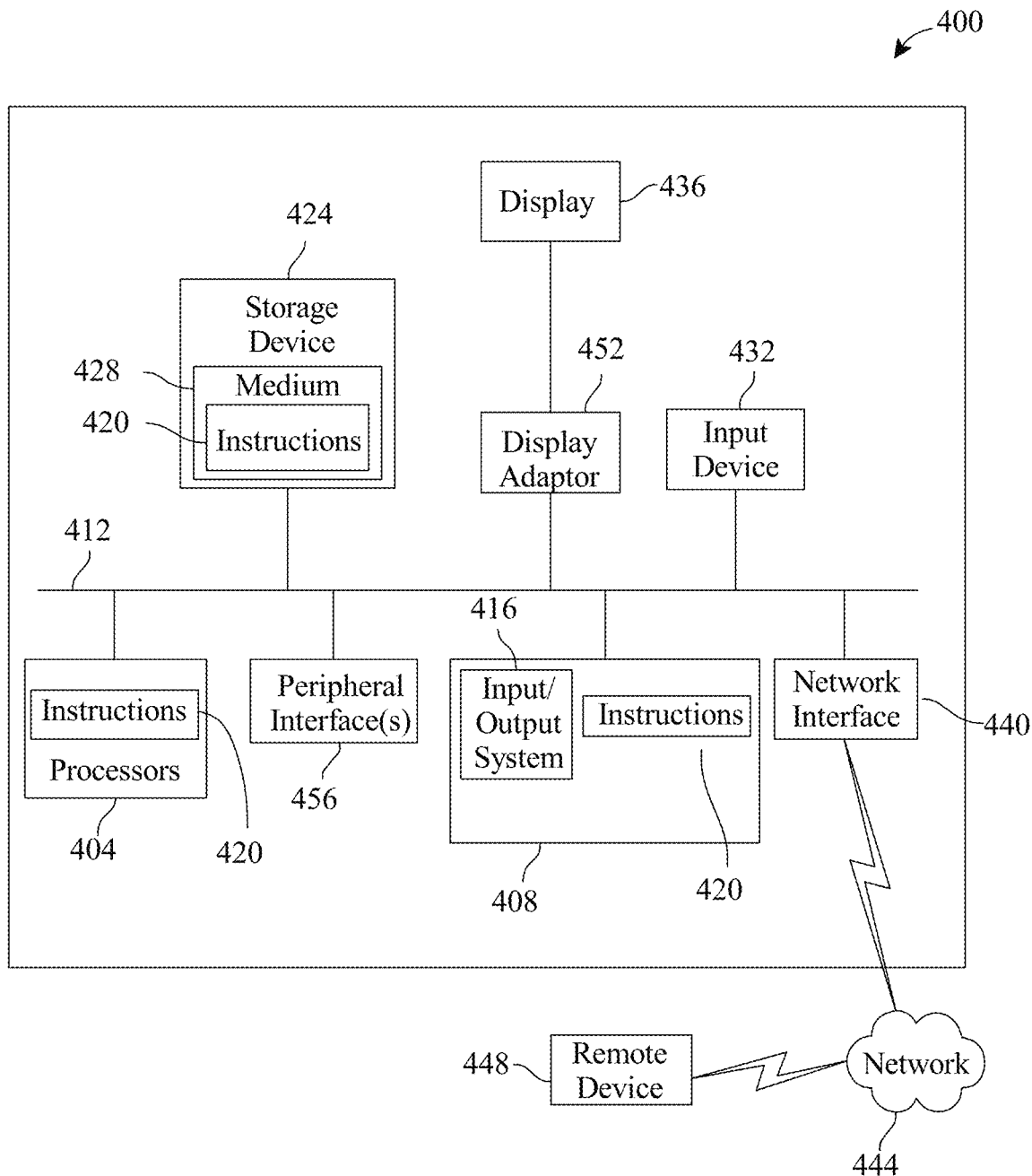
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable media) including, but not limited to, a random access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of selecting a distributed framework, the method comprising:

receiving, by a selection device, a description of a computing task to be performed;
selecting, by the selection device, at least a remote device, of a plurality of remote devices, for inclusion in a distributed framework, wherein selecting the at least a remote device further comprises:
receiving an authorization token including a secure proof of an attestation conferring a credential on the at least a remote device, wherein the authorization token further includes a timestamp generated using an attested time process;
evaluating the authorization token; and
selecting the at least a remote device based on the evaluation of the authorization token, wherein selecting the at least a remote device further comprises:
generating a cost function based on a confidence level and communication latency associated with the at least a remote device; and
minimizing the cost function; and
assigning, by the selection device, the computing task to the at least a remote device.

2. The method of claim 1, wherein receiving the description of the computing task further comprises receiving a description of an amount of memory needed to perform the computing task.

3. The method of claim 1, wherein receiving the description of the computing task further comprises receiving a description of a number of computational cycles needed to perform the computing task.

4. The method of claim 1, wherein receiving the description of the computing task further comprises receiving a description of a type of hardware needed to perform the computing task.

5. The method of claim 1, wherein receiving the description of the computing task further comprises receiving a description of a geographical region in which resources are needed to perform a computing task.

6. The method of claim 1, wherein receiving the description of the computing task further comprises receiving a description of a security constraint for resources needed to perform the computing task.

7. The method of claim 1, wherein receiving the description of the computing task further comprises a resource distribution requirement.

8. The method of claim 1, wherein evaluating the authorization token further comprises verifying inclusion of the credential in a secure listing.

9. The method of claim 1, wherein evaluating the authorization token further comprises:
identifying a temporal attribute of the authorization token; and
evaluating the temporal attribute.

10. The method of claim 1, wherein:
the credential is included in a chain of attestation; and
evaluating the authorization token further comprises evaluating the chain of attestation.

11. The method of claim 1, wherein:
the plurality of remote devices is connected to the selection device via a network; and
selecting the distributed framework further comprises selecting at least a proximate remote device of the plurality of remote devices in a graph representing the network.

12. The method of claim 1, wherein selecting the at least a remote device further comprises selecting at least a geographically proximate remote device of the plurality of remote devices.

13. A system for selecting a distributed framework, the system comprising:
a selection device in communication with a plurality of remote devices, the selection device designed and configured to:
receive a description of a computing task to be performed;
select at least a remote device, of a plurality of remote devices, for inclusion in a distributed framework, wherein selecting the at least a remote device further comprises:
receiving an authorization token including a secure proof of an attestation conferring a credential on the at least a remote device, wherein the authorization token further includes a timestamp generated using an attested time process;
evaluating the authorization token; and
selecting the at least a remote device based on the evaluation of the authorization token, wherein selecting the at least a remote device further comprises:
generating a cost function based on a confidence level and communication latency associated with the at least a remote device; and
minimizing the cost function; and
assign the computing task to the at least a remote device.

14. The system of claim 13, wherein the selecting device is further configured to receive the description of the computing task by receiving a description of an amount of memory needed to perform the computing task.

15. The system of claim 13, wherein the selecting device is further configured to receive the description of the computing task by receiving a description of a number of computational cycles needed to perform the computing task.

16. The system of claim 13, wherein the selecting device is further configured to receive the description of the computing task by receiving a description of a type of hardware needed to perform the computing task.

17. The system of claim 13, wherein the selecting device is further configured to receive the description of the computing task by receiving a description of a geographical region in which resources are needed to perform a computing task.

18. The system of claim 13, wherein the selecting device is further configured to evaluate the authorization token by verifying inclusion of the credential in a secure listing.

19. The system of claim 13, wherein the selecting device is further configured to evaluate the authorization token by:
identifying a temporal attribute of the authorization token; and
evaluating the temporal attribute.

20. The system of claim 13, wherein:
the credential is included in a chain of attestation; and
the selecting device is further configured to receive evaluate the authorization token by evaluating the chain of attestation.

21. The system of claim 13, wherein:
the plurality of remote devices is connected to the selection device via a network; and
the selecting device is further configured to select the at least a remote device by selecting at least a proximate remote device of the plurality of remote devices in a graph representing the network.

22. The system of claim 13, wherein the selecting device is further configured to select the at least a remote device further comprises selecting at least a geographically proximate remote device of the plurality of remote devices.

\* \* \* \* \*